United States Patent [19]

Freeborn

[11] 3,747,006

[45] July 17, 1973

[54] HIGH SPEED AMPLIFIER FOR USE WITH AN INDUCTIVE LOAD

[75] Inventor: John C. Freeborn, West Covina, Calif.

[73] Assignee: Honeywell Inc., Minneapolis, Minn.

[22] Filed: Dec. 2, 1971

[21] Appl. No.: 204,219

Related U.S. Application Data

[60] Division of Ser. No. 48,798, June 8, 1970, Pat. No. 3,638,150, which is a continuation of Ser. No. 707,274, Feb. 21, 1968, abandoned.

[52] U.S. Cl. .................... 330/30 D, 330/13, 330/15, 330/17, 330/69, 330/122

[51] Int. Cl. .................... H03f 3/68

[58] Field of Search .................... 315/27; 330/13, 15, 330/17, 30 D, 46, 69, 118, 122

[56] References Cited

UNITED STATES PATENTS 2,786,903 3/1957 Price .................... 330/122 X

*Primary Examiner*—Roy Lake
*Assistant Examiner*—Lawrence J. Dahl
*Attorney*—Charles J. Ungemach, Charles L. Rubow et al.

[57] ABSTRACT

Amplifier apparatus which employs a center tapped energy storage inductor for rapidly varying the magnitude and direction of current through an inductive load. The load is connected between a source of reference potential and the center tap on the inductor of which opposite ends are connected through current limiting means to power supply terminals at voltages respectively higher and lower than the reference potential. Currents through opposite ends of the energy storage inductor are differentially limited, whereby reducing the current through one portion of the inductor causes a rapid load current change as a result of counter EMF generated by the other portion of the inductor.

11 Claims, 1 Drawing Figure

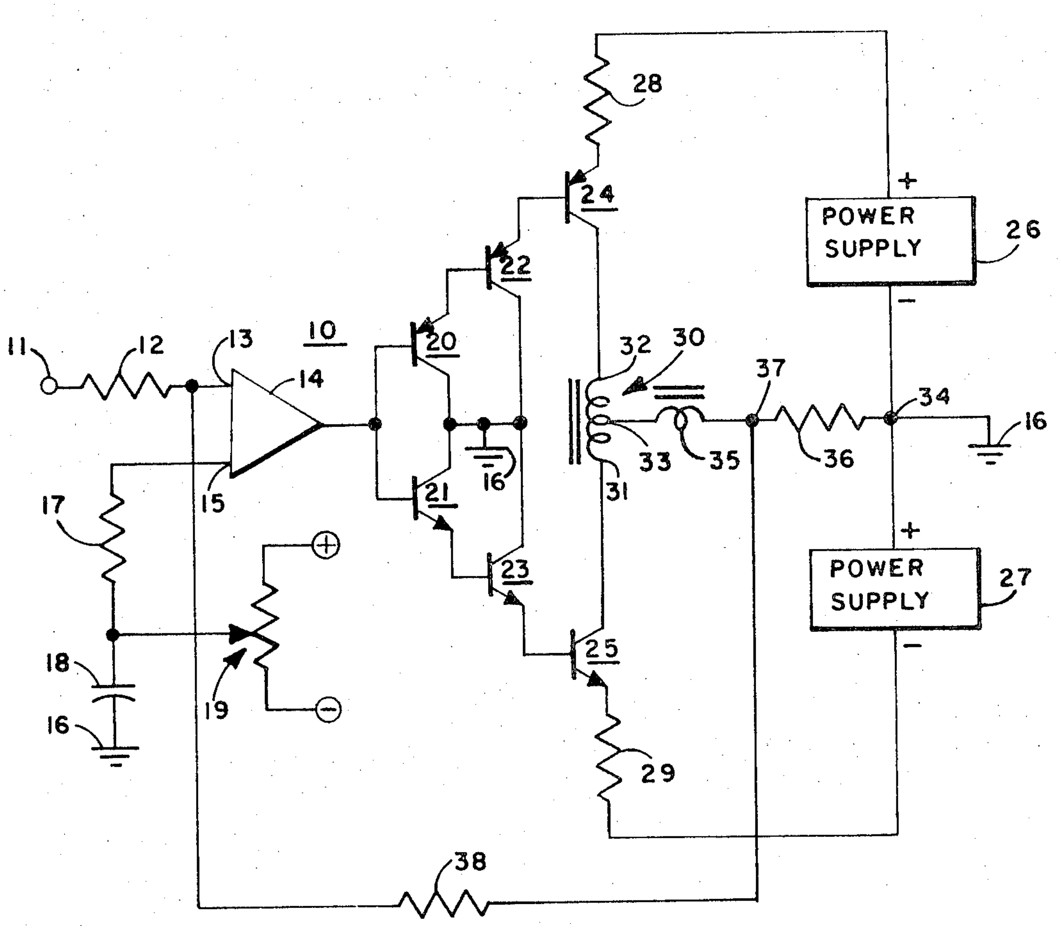
POWER SUPPLY
POWER SUPPLY

HIGH SPEED AMPLIFIER FOR USE WITH AN INDUCTIVE LOAD

CROSS REFERENCES TO RELATED APPLICATIONS

This application is a division of copending application Ser. No. 48,798, filed June 8, 1970, now U.S. Pat. No. 3,638,130, for High Speed Amplifier for Driving an Inductive Load in the name of the same inventor and assigned to the same assignee as the present application. The copending application is a continuation of application Ser. No. 707,274, filed Feb. 21, 1968 (now abandoned) for Control Apparatus in the name of the same inventor and assigned to the same assignee as the present application.

BACKGROUND OF THE INVENTION

The invention herein described pertains generally to electronic signal amplifiers, and more specifically to high performance amplifqers for rapidly varying current through inductive loads.

Apparatus for rapidly changing the current through an inductive load, such as the deflection yoke of a cathode ray tube (CRT), must be capable of producing high voltages to overcome counter EMF inherentily generated when an attempt is made to change the load current. In amplifier apparatus of conventional design, the required driving voltage is achieved by means of a well regulated high voltage power supply. The maximum power supply capability is used only during rapid load current changes which, for low duty cycle applications, occur during small portions of the time the apparatus is in operation. Even though the maximum power supply capability is used only during a small portion of the time, power supply means having such capability must be used to provide satisfactory amplifier performance when maximum capability is needed. The result is that apparatus of the piror art design is frequently overly complex and/or is capable of performance which is not needed during a large percentage of the time.

The present invention overcomes the foregoing disadvantage by utilizing an energy storage inductor to generate high voltages on a low duty cycle basis for decreasing the time required to achieve changes in current through an inductive load, such as the deflection yoke of a CRT. The present invention also has the capability of producing current in either direction through an inductive load. Thus, in the case of a CRT deflection yoke (or other inductive load required to produce a magnetic field which can change direction), a single winding may be used. This provides certain advantages over common prior art apparatus which employs separate windings, each of which is supplied with current in only one direction, for producing oppositely directed fields.

SUMMARY OF THE INVENTION

The applicant's amplifier apparatus basically comprises power supply means having a first terminal at a reference potential and second and third terminals respectively at voltages higher and lower than the reference potential. A center tapped energy storage inductor is connected between the second and third terminals through differential current limiting means. An inductive load is connected between the center tap on the energy storage inductor and the first terminal of the power supply means.

The differential current limiting means may comprise a pair of controllable current limiting devices, each of which is connected between a separate one of the second and third power supply terminals and a separate end of the energy storage inductor. The current limiting devices may be differentially controlled by control means which produces differential control signals. Feedback means may also be included for supplying feedback signals indicative of the magnitude and direction of current flow through the inductive load to the differential control means.

When a change in load current is called for, the current limiting devices function to suddenly decrease current through one portion of the energy storage inductor. Because of the inherent tendency of the inductor and the inductive load to maintain pre-existing currents therethrough, a voltage substantially larger than the power supply voltage is produced at the center tap. The polarity of this voltage relative to the reference potential is determined by the portion of the energy storage inductor through which current flow is limited. The large driving voltage produced at the center tap provides for rapidly changing the load current.

Accordingly, it is a primary object of this invention to provide simple amplifier apparatus capable of rapidly varying current flow in either direction through an inductive load.

It is a further object of this invention to provide an improved CRT deflection amplifier.

It is yet a further object of this invention to provide unique apparatus wherein a center tapped energy storage inductor is employed to increase the speed with which the magnitude and direction of current flow through an inductive load can be varied.

BRIEF DESCRIPTION OF THE DRAWING

The single FIGURE of the drawing is a circuit diagram of amplifier apparatus in accordance with the applicant's invention wherein a center tapped energy storage inductor is employed to rapidly vary current flow through an inductive load.

DESCRIPTION OF THE PREFERRED EMBODIMENT

In the drawing, reference numeral 10 identifies the applicant's unique amplifier apparatus. Amplifier apparatus 10 includes an input terminal 11 which is connected through a resistor 12 to a non-inverting input 13 of a differential amplifier 14. Differential amplifier 14 further includes an inverting input 15 which is connected to ground or a source of reference potential 16 through a resistor 17 and a capacitor 18 connected in series. The junction between resistor 17 and capacitor 18 is connected to a wiper of a potentiometer generally identified by reference numeral 19 which includes a resistance element connected betwen sources of positive and negative potential.

The output signal produced by amplifier 14 is supplied to the bases of a PNP transistor 20 and an NPN transistor 21. The emitter of transistor 20 is connected to the base of a PNP transistor 22. The emitter of transisotr 21 is connected to the base of an NPN transistor 23. The collectors of transistors 20–30 are maintained at the reference potential by means of connection thereof to reference potential source 16. For purposes of this specification, elemements 11–23 comprise differential control means for producing differential control signals.

The emitter of transistor 22 is connected to the base of a PNP transistor 24. The emitter of transistor 23 is connected to the base of an NPN transistor 25. The emitter of transistor 24 is connected to a positive voltage terminal of a first power supply 26 through a resistor 28. The emitter of transistor 25 is connected to a negative voltage terminal of a second power supply 27 through a resistor 29. The negative voltage terminal of power supply 26 and the positive voltage terminal of power supply 27 are connected to reference potential source 16. A center tapped energy storage inductor generally identified by reference numeral 30, and having first and second ends 31 and 32, is connected between the collectors of transistors 24 and 25. The center tap of energy storage inductor 30 is identified by reference numeral 33. As indicated by the graphic symbol used for inductor 30, the inductor is wound on magnetic core to provide substantial inductive coupling between the portions on opposite sides of center tap 33.

Transistors 24 and 25 and certain circuitry associaTed therewith respectively comprise first and second controllable current limiting means. Power supplies 26 and 27 collectively comprise power supply means including first, second and third terminals respectively at the reference potential, a voltage higher than the reference potential and a voltage lower than the reference potential. As is apparent from the drawing, the negative voltage terminal of power supply 26 and the positive voltage terminal of power supply 27 are connected together and to reference potential source 16 at junction 34 so as to comprise the first terminal of the power supply means to which reference is made in the foregoing sentence.

An inductive load 35 and a resistor 36 are connected in series between center tap 33 and junction 34. The junction between inductive load 35 and resistor 36 (identified by reference numeral 37) is connected to non-inverting input 13 of amplifier 14 through a resistor 38. Resistors 36 and 38 and certain circuitry associated therewith comprise feedback signal means for supplying a feedback signal indicative of the magnitude and direction of current flow through inductive load 35 to the differential control means, including elements 11–23.

For purposes of simplifying the description, various active elements of the applicant's amplifier apparatus have been illustrated and referred to as transistors. It is, however, within the applicant's contemplation and teaching that any appropriate switching or amplifying means may be used. In addition, certain of the passive elements, such as those illustrated and described as resistors, may, in some applications, be replaced with other types of impedance elements.

In describing the operation of the applicant's amplifier apparatus, it is helpful to visualize the current flowing through inductive load 35 and resistor 36 as comprising two current components, the first of which is supplied by power supply 26 and flows in one direction through the inductive load from the upper portion of energy storage inductor 30. The second load current component is supplied by power supply 27 and flows in the opposite direction through inductive load 35 from the lower portion of energy storage inductor 30. The magnitude of the net load current is the difference between the magnitudes of the flow through the load is determined by the relative magnitudes of the two load current components. If the load current components are equal, there is no net current flow through inductive load 35 and resistor 36. If the inductive load is the winding of the CRT deflection yoke, equal load current components result in a neutral position of the CRT beam.

It should be noted that the currents produced in separate portions of energy storage inductor 30 by power supplies 26 and 27 respectively are in the same direction and produce like directed magnetic fluxes along common flux paths. In addition, assuming that power supplies 26 and 27 are identical and the transistors in transistor pairs 20–21, 22–23 and 24–25 are complementary, the maximum magnetic fluxes produced by the separate portions of energy storage inductor 30 are equal. Accordingly, if the inductive effect of load 35 were to be eliminated, there would be no discontinuity in the magnetic flux surrounding inductor 30 or the voltage appearing at center tap 33 as current flow is switched from one portion of the inductor to the other.

The operation of amplifier apparatus 10 may be described as follows. An increasing signal applied at terminal 11 will produce a corresponding increasing signal at the output of amplifier 14. Such a signal tends to cause transistors 21, 23 and 25 to conduct and to reduce conduction through transistors 20, 22 and 24. At the same time current is being decreased through the upper portion of inductor 30, a corresponding increase in current in the same direction through the lower portion of inductor 30 is permitted. Considering the inductor 30 alone, shifting current flow from one end of the inductor to the other does not result in any voltage change at the center tap 33 since the portions of the inductor are inductively coupled and identical currents through the separate portions produce like directed magnetic fluxes of the same magnitude.

It can, however, be observed that the currents through separate portions of inductor 30 must be supplied through inductive load 35. Further, it can be observed that currents in the same direction through separate portions of inductor 30 require currents in opposite directions through load 35. Any attempt to reduce or reverse current flow through load 35 is inherently opposed because of the inductive nature of the load. This opposition tends to reduce or reverse the direction of current flow through the lower portion of inductor 30 and the magnitude or direction of magnetic flux associated therewith. With transistor 24 turned off, the potential at end 32 of inductor 30 is free to float. However, a large counter EMF is generated across the lower portion of inductor 30. This counter EMF, which aids the voltage produced by power supply 27, is applied across inductive load 35 and tends to force rapid current changes therethrough.

In the event that a negative going signal is supplied to terminal 11, similar analysis will show that transistor 25 decreases current flow through the lower portion of inductor 30 while transistor 24 permits increased current flow through the upper portion thereof. The magnetic flux generated by inductor 30 remains in the same direction. However, the counter EMF generated by the upper portion of inductor 30 now aids in rapid changes in current through load 35. These current changes are in the opposite direction from current changes produced by a positive going input signal. In accordance with the foregoing discussion, it can be seen that center tapped energy storage inductor 30 can be advantageously used in conjunction with power supply means of moderate capability to increase the speed at which the magnitude and/or direction of current through an inductive load can be varied.

Although well regulated power supplies may be profitably employed with the present invention, such power supplies are not required to provide acceptable operation. Moderate problems caused by lack of regulation can be overcome with a simple feedback circuit. This feedback circuit, which comprises resistors 36 and 38 and certain associated circuitry, serves the additional function of correcting operational instabilities of amplifier apparatus 10 caused by factors other than poor power supply regulation. The feedback circuit produces a feedback signal indicative of the load current which is summed with the input signal before it is supplied to the non-inverting input of amplifier 14. Thus, amplifier 14 is caused to produce a signal which tends to result in the commanded load current regardless of the reason for any differences between the commanded and actual load currents.

Although a specific embodiment of amplifier apparatus employing a center tapped energy storage inductor for rapidly varying current flow through an inductive load is shown for illustrative purposes, other embodiments which do not depart from the applicant's contemplation and teaching will be apparent to those skilled in the art. The applicant does not intend to be limited to the disclosed embodiment, but only by the terms of the appended claims.

What is claimed is:

1. Amplifier apparatus capable of rapidly varying the magnitude and direction of current through an inductive load comprising:

power supply means for supplying current to circuitry connected thereto, said power supply means including first, second and third terminals respectively at the reference potential, a voltage higher than the reference potential and a voltage lower than the reference potential;

inductive load means;

an energy storage inductor including a first portion connected between a first end of said inductor and a center tap thereof, and a second portion connected between a second end of said inductor and the center tap;

first and second controllable current limiting means;

first connecting means for connecting said inductive load means between the first terminal of said power supply means and the center tap of said energy storage inductor;

second connecting means for connecting said first controllable current limiting means between the second terminal of said power supply means and the first end of said energy storage inductor;

third connecting means for connecting said second controllable limiting means between the third terminal of said power supply means and the second end of said energy storage inductor;

differential control means for producing differential control signals; and means for connecting said differential control means to said first and said second controllable current limiting means so that signals from said control means differentially limit the maximum currents through separate portions of said energy storage inductor whereby rapidly decreasing the current through the first portion of said energy storage inductor results in production of a large voltage of one polarity across said inductive load means due to back EMF generated by the second portion of said energy storage inductor, and whereby rapidly decreasing the current through the second portion of said energy storage inductor results in production of a large voltage of the opposite polarity across said inductive load means due to back EMF generated by the first portion of said energy storage inductor.

2. The apparatus of claim 1 wherein the first and second portions of said energy storage inductor are inductively coupled and currents flowing through the first and second portions of said energy storage inductor produce magnetic fluxes of the same polarity.

3. The apparatus of claim 2 wherein said inductive load means comprises a deflection coil for a cathode ray tube.

4. The apparatus of claim 1 wherein:

said first and second controllable current limiting means each includes an amplifier having a control input; and said differential control means comprises a differential amplifier having first and second signal outputs connected to the control inputs of the amplifiers in said first and second current limiting means.

5. The apparatus of claim 4 further including feedback signal means for supplying a feedback signal indicative of the magnitude and direction of current flow through said inductive load means to said differential control means.

6. The apparatus of claim 5 wherein said feedback signal means comprises a first resistive element which forms a portion of said first connecting means and a second resistive element connected between the first resistive element and said differential control means.

7. In amplifier apparatus for rapidly varying the magnitude and direction of current through an inductive element, including power supply means for supplying current to circuitry connected between a first terminal at a reference potential and second and third terminals at voltages respectively higher and lower than the reference potential, and including a first controllable current limiting device connected to limit current flow through the second terminal, a second controllable current limiting device connected to limit current flow through the third terminal and differential control means for producing control signals for differentially controlling said current limiting devices, the improvement which comprises:

a center tapped energy storage inductor including first and second portions on opposite sides of the center tap;

first connecting means for respectively connecting one end of each of the first and second portions of said energy storage inductor to a different one of said first and second controllabe current limiting devices; and second connecting means for connecting said inductive element between the center tap of said energy storage inductor and the first terminal of said power supply means.

8. The apparatus of claim 7 wherein the first and second portions of said energy storage inductor are inductively coupled and currents flowing through the first and second portions of said energy storage inductor produce like directed magnetic fluxes along common flux paths.

9. The apparatus of claim 8 wherein said inductive element comprises a deflection coil for a cathode ray tube.

10. The apparatus of claim 9 further including feedback signal means for producing a feedback signal indicative of the magnitude and direction of current flow through said inductive element; and third connecting means for supplying the feedback signal to said differential control means.

11. The apparatus of claim 10 wherein said feedback signal means comprises a first resistive element which forms a portion of said second connecting means and a second resistive element connected between the first resistive element and said differential control means.

* * * * *